UNITED STATES PATENT OFFICE.

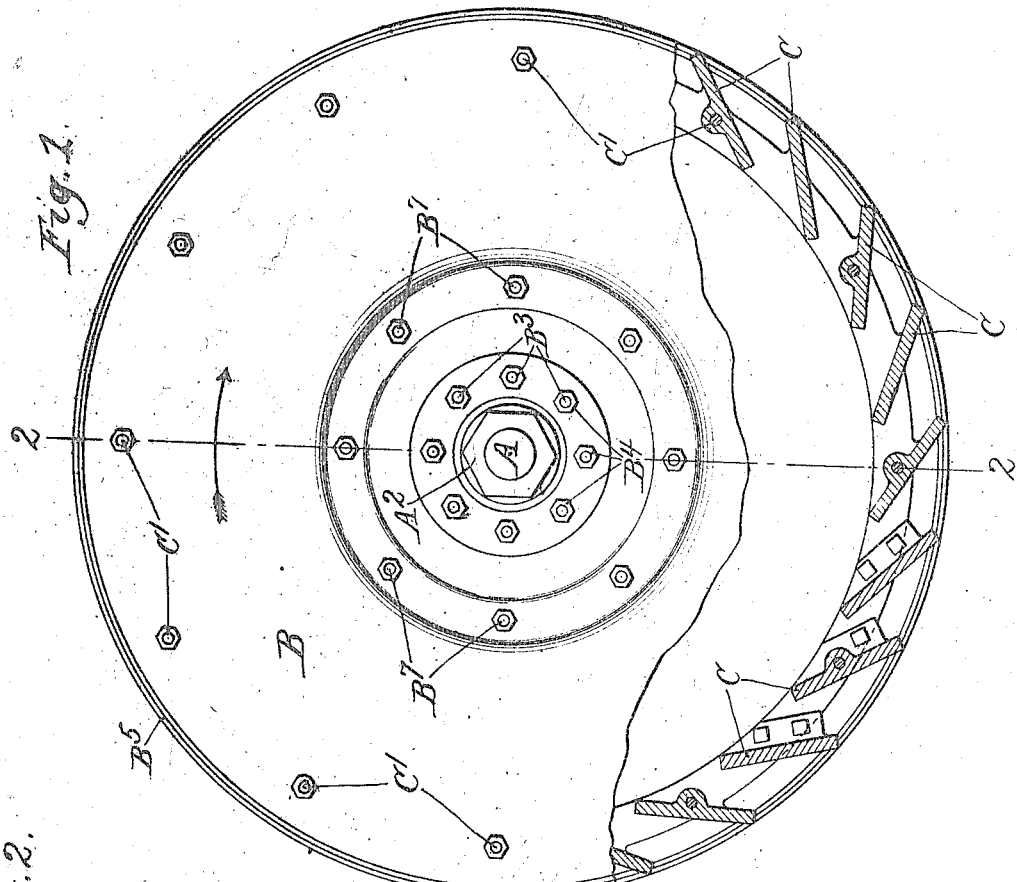
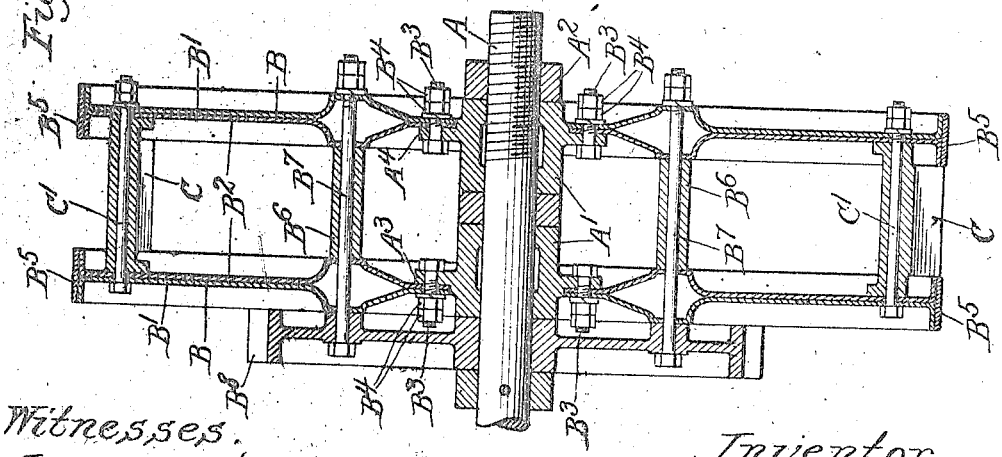

BRYON G. BAKER, OF LAPORTE, INDIANA, ASSIGNOR TO M. RUMELY COMPANY, OF LAPORTE, INDIANA, A CORPORATION OF INDIANA.

WHEEL.

1,133,355.

Specification of Letters Patent.   Patented Mar. 30, 1915.

Application filed July 26, 1913. Serial No. 781,499.

*To all whom it may concern:*

Be it known that I, BRYON G. BAKER, a citizen of the United States, residing at Laporte, in the county of Laporte and State of Indiana, have invented a certain new and useful Improvement in Wheels, of which the following is a specification.

In designing wheels for traction engines, heavy motor vehicles and the like it is necessary to design a wheel which will, first, satisfactorily support the load, second, which will have adequate tractive or adhesive force, and, third, which will in soft and sticky ground be to as large an extent as possible self-cleaning. The problems here suggested are of very great importance particularly where the vehicles are extremely heavy and slow moving and adapted to use in soft ground for here centrifugal force may not be relied upon to clean the wheels by violently projecting the material outwardly away from the center of the wheels.

Assuming a cylindrical wheel to be absolutely rigid rolling upon absolutely rigid ground, it would have a line of contact immediately below and parallel with the axis of rotation of the wheel. As a matter of fact neither the wheel nor the ground are ever rigid and so the wheel sinks in, and it sinks in the ground until its area of contact with the ground is such that the unit pressure is not too great to be borne by the ground. But a smooth, cylindrical wheel does not give satisfactory traction. It slips on the ground and the wheel may even rotate and slide on the ground without moving forward. To prevent this it has been customary to apply to the smooth wheel rim cleats or projections or grouters of many different kinds. These cleats roughen the wheel and enable it to take hold of the ground and by increasing the friction between the ground and the wheel tend to prevent slippage. Unfortunately experience shows that cleats which tend to prevent slippage soon become banked up with loose dirt and clay and the like which is packed firmly in the space between the cleats, and the wheels soon again become round, and the driver must frequently stop to clean these cleats.

Many attempts have been made to provide cleats which would be self-cleaning in some way or other, but no really successful cleat has yet appeared on the market. These cleats, moreover, are satisfactory only when operating on soft ground. When operating on hard ground they tend both to cut the road up and also to make the movement of the tractor jerky and uneven since the wheel then consists of a polygon made up of a large number of separate sides bounded by the apexes of the cleats. This difficulty could be obviated by extending the rim out to the surface of the cleats but then banking would only be rendered more easy because there would be that much less opportunity for the dirt to escape from between the cleats.

It is a well known fact that a flat surface placed on the ground with the weight applied evenly to it furnishes the most satisfactory traction medium. Hence the development of the well known caterpillar type of tractor, but this caterpillar type of tractor has many structural difficulties both in construction and operation which are so well known as to need no discussion here.

Wheels have been used in which the tread surface consists only of cleats or bars with spaces between them so that the material might pass between the cleats and not be jammed or packed between them. Such wheels as this, however, lack support and sink into the ground to such a depth that they become unsatisfactory.

In my invention I provide a wheel which combines the desirable supporting and propelling features of the flat contact with the ground without the structural and operative difficulties of the flat contact or caterpillar type and at the same time is self-cleaning, free from the difficulties with respect to packing of the dirt and which will have all the adhesive qualities and more of the well known type of grouter-equipped, cylindrical wheel.

I propose to use a wheel the periphery of which is made up of a large number of inclined bearing plates or grouters, these plates being inclined to the tangent of the wheel and separate one from another thus giving in effect a discontinuous rim. I propose to design these cleats of such inclination and such area that the wheel will sink into the soil to such a depth that the forward cleat or grouter will always come in contact with the soil at that instant in which it comes into parallelism with it, thus giving the maximum adhesive and tractive force and at the same time giving a flat area of supporting contact. As the wheel rotates this grouter or plate will become more and more inclined to the soil or ground and to a certain extent dig into it in a manner similar to the operation of a horse's hoof. The ground will be packed beneath the impact of the flat plate as it comes in contact with the ground in parallelism and will when the wheel rotates and digs deeper and deeper into the ground be rotated by the rotation of the plate and this plate will pack underneath itself a small mass of compacted ground or soil and will press it backward and downward and tend to rotate it and finally as the wheel leaves the ground it will kick over the mass of compacted soil and break it up, thus leaving the soil in a broken and not in a hard compacted condition. Of course, the weight of the wheel on the soil or ground will tend to force particles through the wheel back of the open-work rim. These particles, however, will be more or less compacted, compressed and hard and as the wheel rotates they will be carried upward on the rearward side and allowed finally to drop back out of the wheel through the cleats in the opposite direction from the path they followed upon entering the wheel.

My invention is illustrated diagrammatically in one form in the accompanying drawings wherein—

Figure 1 is a side elevation of a wheel in part section; Fig. 2 is a section along line 2—2 of Fig. 1.

Like parts are indicated by the same letter throughout the several figures.

The shaft or axle A has rotatably mounted thereon the hub $A^1$ held in position by the nut $A^2$. The hub $A^1$ has the two flanges $A^3$, $A^4$. The stamped steel wheel disks B made up of the stamped plates $B^1$, $B^2$ arranged back to back are bolted to the flanges $A^3$, $A^4$ by the bolts $B^3$ and nuts $B^4$. These wheel plates are bounded by the annular reinforcing tread rings or rims $B^5$ which rest upon the outer flanges of the plates. The sleeves $B^6$ interposed between the plates B, B keep them in fixed space relation one to the other, and bolts $B^7$ passing through these sleeves and through the plates hold the bull gear $B^8$ in fixed relation to the hub and the wheel.

The grouters or tread plates or hoof plates C are arranged about the periphery of the wheel and may be cast in an integral annular ring or in sections or fastened each one separately as the case may be depending altogether upon the size of the wheel. For a very large wheel it would be desirable to cast each one separately, for a slightly smaller possibly in sections, and for a very small wheel it might be desirable to cast the rim as one piece. In any event the sections are bolted in position and held inside the plates $B^5$ by the bolts $C^1$. It will be noted that these grouters or plates are inclined to the radius of the wheel and are disposed as indicated. They tend as they rotate forward in the direction of the arrow to successively approach parallelism with the ground at about the time when they contact the ground surface. It will be understood that the weight of the tractor or vehicle of any kind is substantially fixed and that such a tractor or vehicle is normally designed for service in a relatively restricted area where the hardness or resistance or supporting power of the soil or ground is substantially constant and therefore one width of cleat or grouter or foot plate may be selected which will give that supporting power permitting the grouter to approach the ground substantially in parallelism with it. If conditions change it will be necessary only to put in a wider or narrower cleat as the case may be. This may be done by removing the outer wheel plate, removing the unsatisfactory grouters, inserting others and then replacing the wheel plate. This can be done easily owing to the fact that the parts are only bolted together and all that is necessary is to unscrew the bolts.

The use and operation of my invention are as follows:—The wheel, when driving the vehicle forward, normally rotates in a direction as indicated by the arrow. The successive feet or grouters are brought successively into contact with the ground and subsequently as they leave the ground work it up. The wheel can be described as a device, which first builds up a bank or abutment upon which to travel, and then when through with it kicks it away. Thus when the wheel travels over the ground, it actually spades it up and leaves it in a more or less broken up condition than it found it. The inclination of the grouters, and the fact that there is a free passage through the rim of the wheel between the grouters permits the soft dirt to pass through the rim to a certain extent, and the wheel operates as a self-cleaning wheel, the dirt being constantly forced through the passages into the interior of the wheel. Experience shows that this dirt takes the form of more or less fragmentary masses, and that as the rotation of the wheel continues these masses or particles drop back out through the passages through the rim. This is because, in the rear side of the wheel, these passages are substantially vertical.

In order to obtain the most satisfactory results, experience shows that it is best to so adjust the relative areas of the inclined grouters or tread plates and the continuous bearing surface that the wheel will sink into the ground to such depth that as it rotates the inclined plates come into parallelism with the ground at the same time as they first come into contact with it, the friction between the ground and the plate being thus at a maximum and giving maximum traction in the same way that the flat bearing belt of the capillary type gives maximum traction. The tendency of these grouters will thus be to first compact the ground and then as they rotate to gradually turn the compacted masses over, pushing them rearwardly. This process continues while the grouter is in contact with the ground, and the ground or compacted particles of the ground thus turn over and as the pressure upon them is reduced owing to the further rotation of the wheel and the lifting of the grouter out of contact with the ground the compacted masses will be upset and broken to pieces by the final action of the wheel. This desirable proportion between the weight of the machine, the size of the wheel and the resistance of the ground can easily be maintained because such machines as this are normally sold for use in a relatively constricted area. The weight of the machine is fixed, and the resistance of the ground in a given neighborhood is approximately consistent. Therefore, it is only necessary to design or adjust the wheel so that the desired sinkage will be had in the general average prevailing where the machine is to be used, since slight variations from the normal are not of consequence. This adjustment may be very easily obtained by changing the width of the grouters and the total width of the wheel tread or by changing the width of the continuous bearing surface or by changing the width of both as the case may be. Preferably, however, the adjustment will be obtained by the use of removable tread plates as indicated. In case a wheel sinks in too far, the small tread plates will be removed and larger ones substituted. In case the wheel does not sink in far enough, the tread plates will be removed and smaller ones substituted.

As indicated in the drawings, it is desirable that the grouters be at all times when in contact with the ground beneath the surface of the ground and the grouters are thus preferably of such size that for at least a major portion of the arc of contact with the ground they sink beneath the surface, thus giving them a very strong hold on the ground and adding to their traction possibilities.

It will be noted that my invention as set forth in the specification and drawing and as discussed there consists both of a wheel and the peculiar operation of the wheel and it is the peculiar operation of the wheel I have endeavored to claim as a process for it is obvious that this process is not limited to the particular wheel arrangement which I have illustrated.

I claim:

A wheel for traction vehicles and the like comprising a pair of parallel continuous cylindrical tread members, a plurality of intermittent separate inclined tread members fixed in position between said parallel tread members, the outer edges of said inclined members being substantially in line with the effective tread surface of the cylindrical members, the inner edges of said separate tread members being located inside the effective surface of the cylindrical tread members, all of said tread surfaces being located in planes parallel with the axis of rotation of the wheel.

In testimony whereof, I affix my signature in the presence of two witnesses this 17th day of July, 1913.

BRYON G. BAKER.

Witnesses:
Q. S. SEID,
T. A. KIRSCH.